S. P. HOLZSCHUH.
WEIGHING SCALE.
APPLICATION FILED OCT. 9, 1915.
1,367,144.
Patented Feb. 1, 1921.
2 SHEETS—SHEET 1.
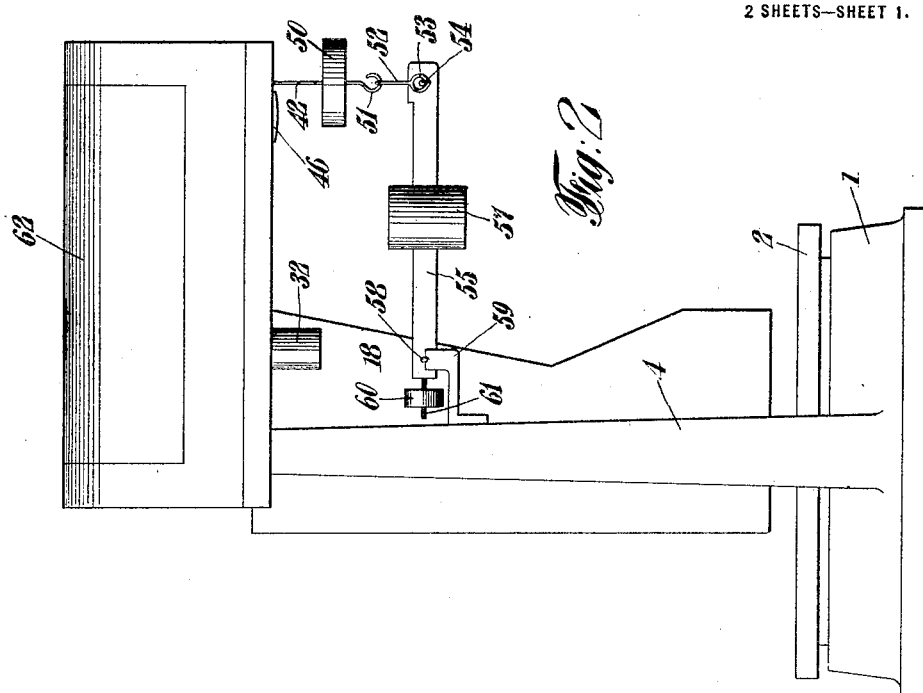
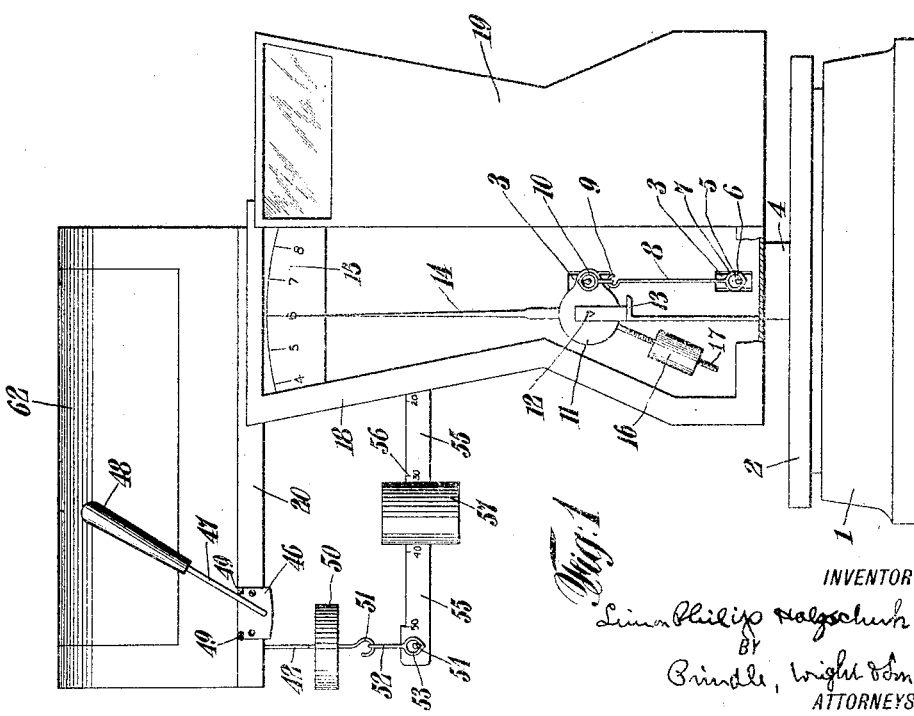
INVENTOR
Simon Philip Holzschuh
BY
Prindle, Wright & Small
ATTORNEYS

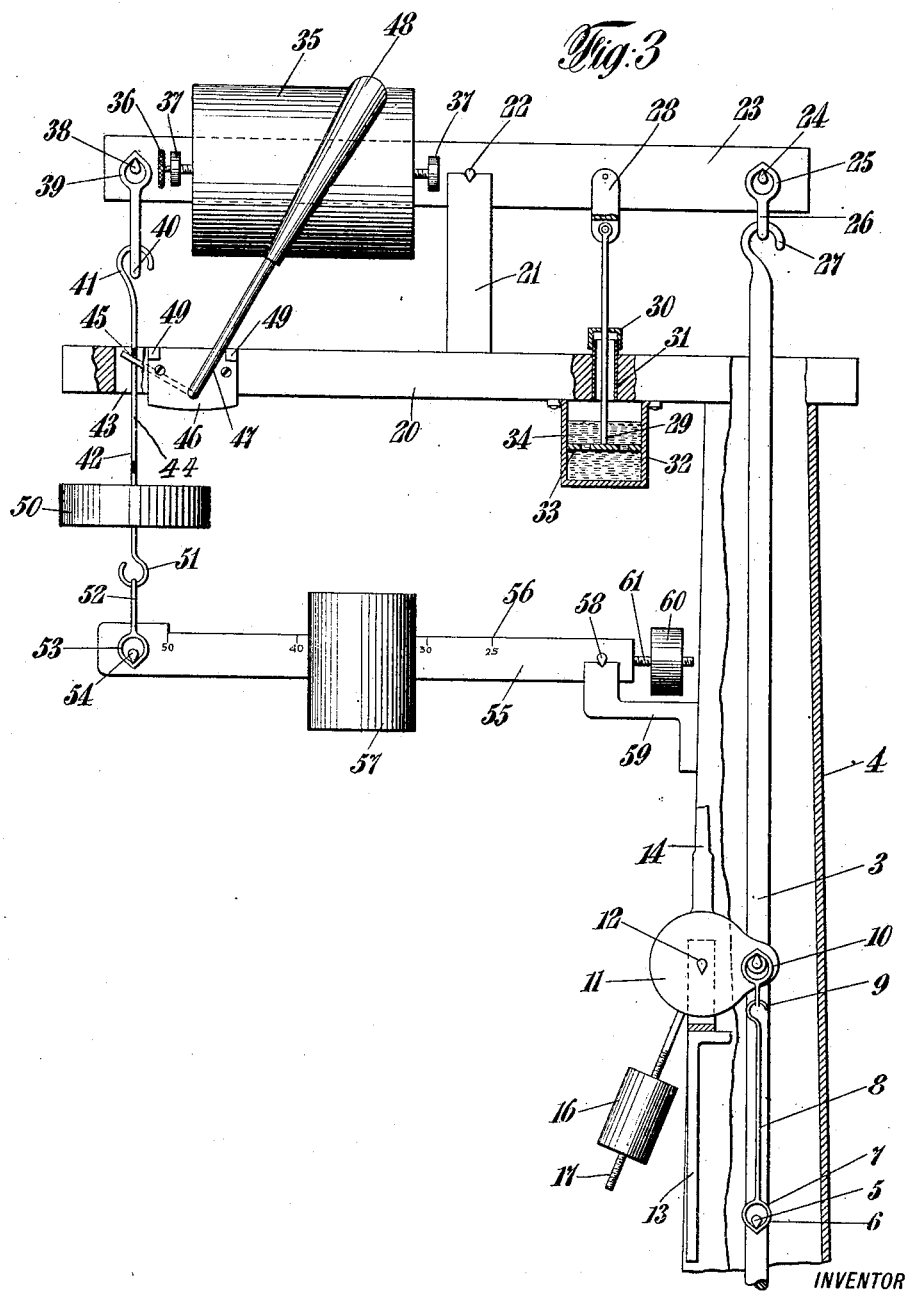

UNITED STATES PATENT OFFICE.

SIMON PHILIP HOLZSCHUH, OF PAULSBORO, NEW JERSEY, ASSIGNOR, BY MESNE ASSIGNMENTS, TO E. I. DU PONT DE NEMOURS AND COMPANY, A CORPORATION OF DELAWARE.

WEIGHING-SCALE.

1,367,144.  Specification of Letters Patent.  Patented Feb. 1, 1921.

Application filed October 9, 1915. Serial No. 55,047.

*To all whom it may concern:*

Be it known that I, SIMON PHILIP HOLZSCHUH, of Paulsboro, in the county of Gloucester, and in the State of New Jersey, have invented a certain new and useful Improvement in Weighing-Scales, and do hereby declare that the following is a full, clear, and exact description thereof.

My invention relates generally to a weighing scale adapted to be used to supply a container, which is to be supported by the scale during the weighing operation with a weighed amount of material. My invention is applicable to many different uses, but it is particularly useful in packing houses where it is desired to fill boxes of varying weight with a quantity of material of a desired weight while the container is on the scale, as for example in the filling of powder kegs with powder prior to shipment of the same.

The object of my invention is to provide a scale of this character in which a container to be supplied with a weighed body of material may be first placed upon the scale, and in which thereafter the desired amount of material may be supplied to the container while on the scale, the amount being readily determinable from the scale while the container is being filled with material on the scale. Further objects of my invention will appear from a consideration of the detailed description thereof appearing hereinafter.

While my invention is capable of embodiment in many different forms, for the purpose of illustration I shall show only one form thereof in the accompanying drawings, in which—

Figure 1 is a front elevation of an apparatus made in accordance with my invention;

Fig. 2 is a rear elevation of the same; and

Fig. 3 is an enlarged detail partly in section of the upper part of the apparatus.

In the drawings I have shown a scale having a base frame 1, upon which there is supported a platform 2, which is connected to a beam rod 3 passing up through a column 4 attached to the base 1. On the beam rod 3 there is preferably provided a pin 5 which projects out through the front of the column 4, which has a knife edge 6 on its lower side, which knife edge coöperates with a yoke 7 on a rod 8, the upper end of which is provided with a hook 9 engaging with a yoke 10 on a plate 11. The plate 11 forms a part of a weight indicating device of suitable character, and in the present instance is provided with pins 12 having knife edges supported upon a bracket 13 attached to the side of the column 4. Projecting upwardly from the plate 11 there is a pointer 14 coöperating with a scale 15, which preferably has a series of figures limited to the range of weights of the containers to be used, for indicating the weight of the receptacle prior to the filling of the same and also for indicating when the receptacle has been filled with the desired weight of material, as hereinafter described. A balance weight 16 is screw-threaded upon a bar 17 attached to the plate 11 so as to balance the parts associated with the plate 11. Preferably, a housing 18 is provided for inclosing the plate 11 and its attached parts, said housing having a door 19 adapted to move outwardly over the scale platform 2. At its upper end, the column 4 is provided with a horizontal arm 20 having a pair of uprights 21 to support knife edges 22 carried upon an upper scale beam 23, which has knife edges 24 at one end to support a yoke 25 having an eye 26 engaging with a hook 27 on the upper end of the beam rod 3. Near the same end of the upper scale beam 23 there is a bracket 28 connected with a piston rod 29, which has a cover 30 located over a table 31 leading downwardly through the horizontal bar 20 and into the top of a cylinder 32 provided for receiving a piston 33 attached to the piston rod 29. The piston 33 is arranged to move up and down in a body of oil 34 in the cylinder 32. The upper scale beam 23 is further provided with an adjacent balancing weight 35 having screw-threaded engagement with a screw 36 adapted to rotate in brackets 37 on the scale beam 23. In connection with the scale beam 23 an adjustable weight applying device is employed to set the scales for the weight of material desired to be placed within the container. At the remaining end of the scale beam 23 there are provided knife edges 38 to coöperate with a yoke 39 having an eye 40, which is arranged to receive a hook 41 on a link 42 passing upwardly through a hole 43 in the end of the frame 20. The link 42 has an opening 44 near the middle of the same which coöperates with a lever 45 pivoted to a bracket 46 on the arm 20 and having a hand-operating lever 47 with a weight 48 on the upper end thereof to move the link 42 upwardly out of engagement with the yoke 39 when desired. Stops 49 limit the movement of the hand lever 47. At its lower end the link 42 raises a balancing weight 50, and below the same is provided with a hook 51 to engage an eye 52 on a yoke 53 coöperating with knife edges 54 on a lower scale beam 55, which is provided with a scale of pounds 56, preferably confined to the range of weights of material designed to be supplied to the containers to be filled, to engage in varying positions with a sliding weight 57 on the scale beam 55. The other end of the lower scale beam 55 rests by means of knife edges 58 upon a bracket 59 secured to the side of the column 4, and said scale beam 55 has, furthermore, a balancing weight 60 screw-threaded to a bar 61 projecting out from its end of the lower scale beam 55. If desired, the parts at the top of the scale may also be inclosed by a housing 62 having any suitable fastening means.

In the operation of my invention when it is desired to make use of the scale for filling a container, as for example, a box with a desired weight of material for shipment, the box is placed upon the scale platform 2, and the hand-lever 47 is moved to one side so as to lift the link 42, thus throwing the hook 41 out of engagement with the yoke 39. The balance weight 48 retains the parts in this position until the hand-lever 47 is again moved, as hereinafter described. The elevated position of the link 42 throws the lower scale beam 55 out of operation. The remaining movable parts of the apparatus would now preferably be in balanced condition were it not for the presence of the box upon the scale platform 2. The box on the platform 2, however, moves the pointer 14 over the scale 15 to a point thereon indicating exactly the weight of the box. The hand-lever 47 is now moved to the other position, that is to say, so as to throw the hook 41 into engagement with the yoke 39 and the movable weight 57 is moved along the scale of pounds 56 to the figure indicating the number of pounds of material with which the box is to be filled. The material to be supplied to the box is now gradually introduced in the same until the pointer 14 reaches the point on the scale 15 previously noted as indicating the weight of the empty box. When this point is reached the box has been filled with the desired weight of material, and can be removed for shipment, etc. During the movement of the parts in the weighing operations, the retarding movement of the piston 33 in the cylinder 32 prevents the parts from moving so suddenly as to cause damage to the same. In this way, any container desired to be filled with a body of material of a desired weight can be expeditiously and readily filled with the desired weight of material, notwithstanding the varying weights of the different containers to be filled.

While I have described my invention above in detail, I wish it to be understood that many changes may be made therein without departing from the spirit of my invention.

I claim:

1. In a weighing scale, the combination of a support for the container to be filled with a weighed amount of material, means indicating the weight of the container, a scale beam with an adjustable weight indicating the weight of the material in the container and devices connecting the scale beam and the first mentioned indicating means, comprising an intermediate beam having an adjustable weight forming part of the means to determine the weight of the container.

2. In a weighing scale, the combination of a support for the container to be filled with a weighed amount of material, means indicating the weight of the container, a scale beam with an adjustable weight indicating the weight of the material in the container and devices connecting the scale beam and the first mentioned indicating means, comprising an intermediate beam having an adjustable weight forming part of the means to determine the weight of the container, said devices having means for disconnecting the same when desired.

3. In a weighing scale, the combination of a support for the container to be filled with a weighed amount of material, means indicating the weight of the container, a scale beam with an adjustable weight indicating the weight of the material in the container and devices connecting the scale beam and the first mentioned indicating means, comprising an intermediate beam having an adjustable weight forming part of the means to determine the weight of the container, and a retarding device.

4. In a weighing scale, the combination of a support for the container to be filled with a weighed amount of material, means indicating the weight of the container, a scale beam with an adjustable weight indicating the weight of the material in the container and devices connecting the scale beam and the first mentioned indicating means, comprising an intermediate beam having an adjustable weight forming part of the means to determine the weight of the container, said devices having means for disconnecting the same when desired, and a retarding device.

5. In a weighing scale, the combination of a support for the container to be filled with a weighed amount of material, means indicating the weight of the container, a scale beam with an adjustable weight indicating the weight of the material in the container and devices connecting the scale beam and the first mentioned indicating means, comprising an intermediate beam having an adjustable weight forming part of the means to determine the weight of the container, and a retarding cylinder and plunger.

6. In a weighing scale, the combination of a support for the container to be filled with a weighed amount of material, means indicating the weight of the container, and a scale beam with an adjustable weight indicating the weight of the material in the container and devices connecting the scale beam and the first mentioned indicating means, comprising an intermediate beam having an adjustable weight forming part of the means to determine the weight of the container, said devices having means for disconnecting the same when desired, and a retarding cylinder and plunger.

In testimony that I claim the foregoing I have hereunto set my hand.

SIMON PHILIP HOLZSCHUH.

Witnesses:
H. A. STILLWELL,
W. S. WARD.